US006011977A

United States Patent [19]

Brown et al.

[11] Patent Number: 6,011,977

[45] Date of Patent: *Jan. 4, 2000

[54] RF SIMULCASTING SYSTEM WITH DYNAMIC WIDE-RANGE AUTOMATIC SYNCHRONIZATION

[75] Inventors: Thomas A. Brown, Lynchburg; Marvin C. Baker, Forest, both of Va.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,155

[22] Filed: Nov. 30, 1995

[51] Int. Cl.[7] .................................................... H04B 7/26

[52] U.S. Cl. ......................................... 455/503; 455/67.6

[58] Field of Search ................................ 455/51.2, 51.1, 455/67.1, 502, 503, 67.4, 67.6; 375/356

[56] References Cited

U.S. PATENT DOCUMENTS

| | | | |
|---|---|---|---|
| 4,525,685 | 6/1985 | Hesselberth . | |
| 4,607,257 | 8/1986 | Noguchi | 455/67.6 |
| 4,696,051 | 9/1987 | Breeden . | |
| 4,696,052 | 9/1987 | Breeden | 455/503 |
| 4,903,321 | 2/1990 | Hall et al. . | |
| 5,003,617 | 3/1991 | Epsom et al. . | |
| 5,128,934 | 7/1992 | Jasinski . | |
| 5,155,859 | 10/1992 | Harris et al. . | |
| 5,172,396 | 12/1992 | Rose, Jr. et al. . | |
| 5,172,932 | 12/1992 | Rose . | |
| 5,201,061 | 4/1993 | Goldberg et al. . | |
| 5,212,807 | 5/1993 | Chan . | |
| 5,220,676 | 6/1993 | LoGalbo et al. . | |
| 5,243,299 | 9/1993 | Marchetto et al. . | |
| 5,245,634 | 9/1993 | Averbuch . | |
| 5,261,118 | 11/1993 | Vanderspool, II et al. . | |
| 5,280,629 | 1/1994 | Lo Galbo et al. | 455/67.6 |
| 5,335,357 | 8/1994 | Fennell et al. . | |
| 5,416,808 | 5/1995 | Witsaman et al. | 455/503 |
| 5,423,059 | 6/1995 | Lo Galbo et al. . | |
| 5,448,758 | 9/1995 | Grube et al. | 455/503 |
| 5,481,258 | 1/1996 | Fawcett et al. | 455/502 |
| 5,485,632 | 1/1996 | Ng et al. . | |
| 5,542,119 | 7/1996 | Grube et al. | 455/503 |
| 5,697,051 | 12/1997 | Fawcett | 455/503 |
| 5,729,549 | 3/1998 | Kostreski et al. | 455/4.1 |
| 5,734,985 | 3/1998 | Ito et al. | 455/503 |
| 5,745,840 | 4/1998 | Gordon | 455/67.6 |

FOREIGN PATENT DOCUMENTS

| | | |
|---|---|---|
| 0 246 619 | 5/1976 | European Pat. Off. . |
| 0 515 214 A1 | 11/1992 | European Pat. Off. . |
| 0 551 126 A1 | 7/1993 | European Pat. Off. . |
| 0 553 537 A1 | 8/1993 | European Pat. Off. . |
| 61-107826 | 5/1986 | Japan . |
| WO 92/13417 | 8/1992 | WIPO . |
| WO 93/07682 | 4/1993 | WIPO . |

*Primary Examiner*—Andrew I. Faile
*Assistant Examiner*—Aung S. Moe
*Attorney, Agent, or Firm*—Nixon & Vanderhye P.C.

[57] ABSTRACT

A new simulcast dynamic delay adjustment capability for a radio frequency (RF) simulcasting repeater system continually, dynamically adjusts the amount of delay applied to a T1 data stream to ensure common synchronization at multiple simulcast transmitter sites. A Global Positioning System (GPS) distributed time standard provides timing references at a control point and at each transmit site. The control point sends a version of its GPS timing reference signal to each transmit site over links also used to carry signals for transmission over-the-air. The transmit sites compare the arrival time of the land line-distributed reference signal with the output of a version of the same signal produced by a local GPS signal. The result of the comparison is used to adjust an amount of additional delay introduced to equalize delays for different transmission site links. This arrangement eliminates the need for resynchronization of the control point, allows for automatic, dynamic correction/compensation of path delay changes, and can correct delays over a wide range not known ahead of time with the delay amount being independent of over-the-air timing reference signal frequencies—all without loss of service.

38 Claims, 5 Drawing Sheets

FIG. 4 T1 DELAY CONTROL

T1 DELAY

RF SIMULCASTING SYSTEM WITH DYNAMIC WIDE-RANGE AUTOMATIC SYNCHRONIZATION

FIELD OF THE INVENTION

This invention relates to radio frequency communications systems, and more particularly to simulcast RF systems in which the same RF signal is transmitted substantially simultaneously by multiple physically-separated transmitters operating on the same frequency to achieve wider area coverage. More particularly, the present invention relates to techniques and arrangements for synchronizing the timing of multiple simulcasting transmission sites.

BACKGROUND AND SUMMARY OF THE INVENTION

Most people are familiar with radio communications systems in which a single transmitting site transmits to an associated coverage area. Radio and television broadcasters use this approach. Due to power output and other limitations, the coverage area of a single transmitter may be too limited to reach the desired audience of radio users. In radio and television broadcasting, this problem is sometimes solved by providing a "network" of multiple transmitting stations all carrying the same program. To avoid interference, nearby stations operate at different frequencies (i.e., on different radio or television "channels"). A person driving from say, Washington D.C. to Richmond, Va., may for example, retune her radio from the Washington network-affiliated station to the Richmond network-affiliated station when the Washington station becomes too weak to hear. "Cellular" radio-telephone systems operate in a similar way by automatically controlling the user's cellular phone to automatically retune to a different frequency as the user leaves one "cell" (transmit site coverage area) and enters another—while automatically routing the user's call signals to the new "cell" and transmit frequency.

The types of radio services described above are carefully designed to avoid interference between radio transmitters operating on the same frequency. For example, the Federal Government only licenses a single radio or television to operate on any given frequency in a major metropolitan area, and typically requires substantial frequency spacing between nearby transmitters to make sure their transmissions do not interfere.

Simulcast systems transmit substantially the same signals simultaneously from multiple physically-separated transmitters to achieve a wider coverage area than could be accomplished using a single transmitter. Unlike many other systems, however, each of the simulcast transmitters transmits the same signals on substantially the same frequency at substantially the same time, so that radio receivers within intentionally overlapping coverage areas can receive signals from multiple simulcast transmitters simultaneously without interference.

FIG. 1 shows a simple example of a simulcast transmission system comprising three physically-separated transmitter sites S1, S2 and S3. A common control point C sends each of these transmitter sites S1, S2 and S3 the same signal for transmission. Transmitter site S1 transmits the signal over a particular radio frequency to its coverage area A1, and transmitter sites S2 and S3 each transmit this same signal at substantially the same time over substantially the same radio frequency to their respective coverage areas A2 and A3. A mobile radio receiver M can receive the simulcast transmitted signal so long as it is within at least one of the coverage areas.

The system is designed so that coverage areas A1, A2 and A3 intentionally overlap one another (see the cross-hatched regions in FIG. 1) to eliminate "holes" in the overall system coverage. The radio receiver M may receive the transmissions from more than one site whenever it is in one of these overlap regions. For example, if receiver M is within the overlap region marked "X", it is within both the A2 coverage area of transmitter site S2 and the A3 coverage area of transmitter site S3—and will receive both the signal transmitted by transmitter S2 and the signal transmitted by transmitter S3. The receiver M will typically be "captured" by the strongest received signal (at least if FM modulation is being used), and a weaker one will have little or no effect on reception. However, if the receiver M is positioned in the overlap area so that it receives each of the multiple signals at about the same strength, both signals will contribute to what is received by the radio receiver. These multiple received signals will not interfere with one another only if they are at nearly or exactly the same frequency and have nearly or exactly the same timing.

The timing aspect is especially critical. Even small timing differences (e.g., on the order of thousandths of a second) can cause problems in reception clarity and reliability. For example, even small timing differences can garble high speed digital signals, causing the receiver to miss important calls.

There are problems in providing precise timing synchronization as described above. For example, because the transmitter sites S1, S2 and S3 are physically separated from one another, they are each connected to control point C by a different communication link. Link L1 connects site S1 to control point C, link L2 connects site S2 to the control point, and link L3 connects site S3 to the control point. In the general case, links L1, L2 and L3 have different lengths and other characteristics that cause the delay time it takes for signals to travel over the links to be different. Therefore, the time delay involved in transmitting the transmission signal from control point C to transmitter site S1 over link L1 will, in general, be different from the time delay involved in transmitting the common signal to site S2 over communication link L2—and the link L3 used to communicate the signal to transmitter S3 will, in general, provide a still different time delay. These different time delays must be compensated for if the simulcast system is to operate reliably to provide synchronized transmit timing.

Much work has been done in the past in an attempt to solve this problem. One prior system, described in commonly-assigned U.S. Pat. No. 5,172,396 filed Dec. 27, 1999 to Rose et al., uses a "master" resynchronization circuit at the control point C to generate reference timing. These reference tones are sent to each of the transmit sites S1, S2, S3. Each transmit site has a resynchronization ("resync") circuit that takes data received over the respective control point link and resynchronizes it by aligning it with the reference timing. In this prior system, the reference timing is encoded in tones including a lower frequency (300 Hz) "gating" signal and a higher (2400 Hz) frequency reference signal. The reference tones are typically sent over high-quality, extremely stable signal paths since any variation or noise can effect system performance.

A further improvement described in commonly-assigned copending U.S. patent application Ser. No. 08/364,467 involves placing a Global Positioning System ("GPS") receiver at each simulcast transmitter site. Such GPS receivers are now commonly used for navigation and other purposes. The GPS employs 24 satellites in 55° inclined orbits 10,000 miles above the Earth to transmit precise timing signals that allow a GPS receiver anywhere on Earth to determine its own location. A 1575 MHz transmission carries a 1-MHz-bandwidth phase-modulated signal called the clear acquisition (C/A) code. When a GPS receiver receives this signal from at least three GPS satellites, it can determine its own latitude and longitude to an accuracy of about 30 meters.

In this prior simulcast system, the control point C does not need to distribute reference edges/tones. Instead, the GPS receiver at each site is used to provide a stable, precise timing reference (e.g., a precise, stable 9600 bps clock and a lower frequency gating signal). Each transmitter site S1, S2, S3 resynchronizes its received data using the timing references provided by its local GPS receiver. Because these reference timing signals are not sent over the same type of links used for signals to be transmitted, there is no need to provide wide band, stable channels. Moreover, any link latency variation (within a gating window) is automatically corrected when a "resync" is performed.

Although the GPS arrangement described above has been highly successful, further improvements are possible. One previously unsolved problem was that the amount of time delay compensation possible was too limited and was dependent on the period of the reference signal. Ericsson's EDACS land-mobile trunked radio communications system, as an example, constrains the choice of a reference gating frequency to be a multiple of the frame timing (30 Hz) and a sub-multiple of the data transmission rate (9600 bps). A 300 Hz frequency has been used in commercially released EDACS systems, limiting the amount of time delay compensation to the period of this reference frequency (i.e., 3.3 milliseconds for a 300 Hz reference). Compensation greater than this amount would lead to ambiguity in the amount of correction required. Selecting a lower reference frequency (e.g., 60 Hz) provides a longer gating period (e.g., 16.6 milliseconds), but even this period may not provide enough compensation range depending upon the particular installation involved—and the EDACS system constraints discussed above do not allow the reference frequency to be arbitrarily chosen based on the amount of compensation required.

Another previously unsolved problem was that prior compensation arrangements were sometimes overly complicated. For example, in one prior EDACS arrangement, a different delay circuit was provided for each voice path and for each data path. This compensation approach did not take advantage of the fact that the voice and data paths can be sent over the T1 link in a common stream, and required the use of redundant circuitry that increased system cost.

The present invention solves these problems. It provides improved resynchronization arrangements and techniques for automatic, dynamic correction/compensation of path delay changes that provides a timing correction range that is independent of the gating reference frequency. Techniques and arrangements provided by this invention can correct delays over a wide timing range not known ahead of time, dynamically correct for path delay changes during system operation without loss of service, and apply a single delay correction to an entire transmitter site. These techniques and arrangements may provide path delay change correction up to a maximum limited only by the transmit system protocol—for example, up to one second. They also eliminate the need to be concerned with the phase of the gate reference from a GPS receiver, can be used to eliminate resynchronization at the control point, and are fully compatible with other improvements such as "auto align clear voice" and land line backup features disclosed in commonly assigned copending patent application Ser. No. 08/535,932, filed Sep. 28, 1995.

In accordance with one aspect provided in accordance with the present invention, the simulcast control point uses a GPS receiver to provide a reference signal. The control point provides this reference signal along with voice and data signals for transmission (plus additional timing and control signaling) to multiple simulcast transmit sites over associated communication links. Each transmit site includes a GPS receiver that provides the same frequency reference signal. A timing comparator compares the timing of the reference signal generated by the transmit site's local GPS receiver with the timing of the reference signal the transmit site receives from the control point over its control point communications link. The result of this comparison is used to adjust a variable delay added to the control point communication link's inherent delay.

If the communications link is a T1 or E1 microwave link or other TDM link, this additional variable delay may act to delay the composite TDM data stream before a subsequent multiplexer separates the data stream into its individual signal components. Thus, at the transmit sites, all of the signals—data, voice, and reference—are delayed by the same variable added delay before being separated and sent to the individual RF channel repeaters.

In one example arrangement, the control site generates and provides, over the control site communications link, a gating reference signal in addition to the reference signal. The transmit site extracts the reference signal from a landline composite signal and compares it to the locally generated GPS reference. A timing comparator at the transmit site adjusts the variable delay to force the two reference signals to "match up." Since each transmit site does the same thing, each transmit site succeeds in adjusting the gating reference to be "the same" as at all other transmit sites.

The GPS receivers at each transmit site in this example are set up with a fixed delay relative to the GPS receiver at the control point (plus or minus any optional site specific desired offset) that forces all sites to "wait" by this amount. The variable delay at each site absorbs any delay not used by the link. Thus, this fixed delay—not a gating reference frequency—determines the correction range for the overall system. The fixed delay can be made as large as convenient (e.g., one second).

Because the overall system is monitored and corrected based on the GPS reference signal (which may be one pulse-per-second for example), it is very quick in responding. The reference signal comparison is part of the normal system operation, so there is no need to operate in any different "mode" or otherwise discontinue normal system operation to dynamically compensate for changes in variable path delay. The delay adjustment technique is completely transparent, continuous, and operates alongside normal system operations. Unlike some prior techniques, no special "alignment" or "synchronization" mode needs to be executed to adjust the delay.

BRIEF DESCRIPTION OF THE DRAWINGS

These and other features and advantages provided by the present invention will be better and more completely understood by referring to the following detailed description of a presently preferred example in connection with the drawings of which:

FIG. 4 is a schematic diagram of a more detailed example of a "T1 delay control" block;

DETAILED DESCRIPTION OF A PRESENTLY PREFERRED EXAMPLE EMBODIMENT

Figure 2:
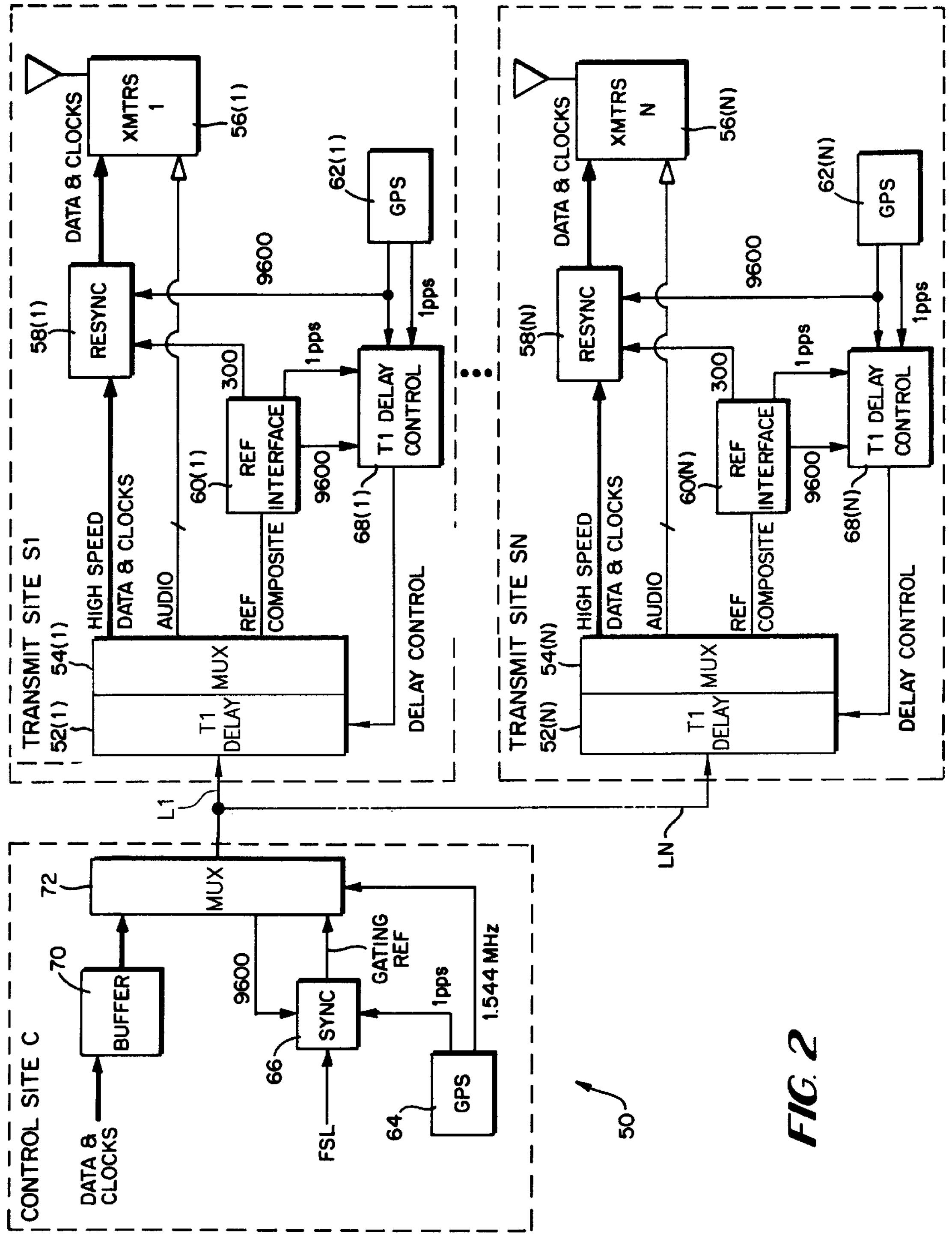
FIG. 2 is a schematic block diagram of a presently preferred example system provided by this invention.

FIG. 2 shows an example simulcast system 50 including a control site C and multiple transmit sites S1 . . . SN (any number of transmit sites S can be used, but only two are shown for purposes of illustration). In this example, control site C communicates signals to be transmitted plus control and timing signals to transmit site S1 over a T1 (E1) communications link L1, and communicates these same signals to transmit site SN over a T1 (E1) link LN. Links L1, LN generally have different propagation delays. Transmit sites S1, SN must nevertheless transmit the signals they receive over their respective links at substantially the same timing.

In this example, each of transmit sites S1, SN includes a T1 delay arrangement 52. This T1 delay arrangement 52 receives the T1 data stream from associated link L and delays the data stream by an additional, adjustable amount (the amount being different for each transmit site in the general case) so as to compensate for the different link delay times. T1 delay arrangements 52 (and associated delay control circuits) thus ensure that the transmit timing of the different sites are synchronized.

Each transmit site S may include a bank of transmitters 56 capable of transmitting twenty-four EDACS RF signal streams simultaneously on different associated radio frequencies. In this example, the T1 TDM communications link is capable of carrying all of this information. This is accomplished, for example, by the use of conventional 5-to-1 compression techniques for the data and conventional 2-to-1 compression techniques for the voice signals, to allow the information required by the entire site to "fit" onto a single T1 link. These compression techniques allow five individual data channels to be encoded and carried by a single T1 TDM bus slot, and allow two voice channels to be carried by a single bus slot.

In this example, the composite of the signals transmitted over the T1 link L—data, voice and reference-are delayed by variable T1 delay block 52 before being separated into individual signal components by a subsequent multiplexer 54. The multiplexer 54 separates and decompresses the information carried by the T1 link to provide twenty-four separate audio signal streams to transmitter 56. In addition, the multiplexer 54 separates and recovers the high speed data and clocking signals, which it provides to a conventional resync unit 58 of the type described in U.S. Pat. No. 5,172,396 to Rose. The resync unit 58 in this example provides a "fine" resynchronization correction to ensure that the high speed data and clocking edges precisely line up in timing.

Each transmit site S1, SN has a GPS receiver 62 to locally generate timing signals. In this example, GPS receiver 62 is a conventional Global Positioning System receiver that has been slightly modified to provide an additional programmable delay for at least one of its outputs. GPS receiver 62 in this example produces a one pulse-per-second (pps) reference signal based on very precise atomic clocks carried by GPS satellites in geosynchronous orbit. The GPS receiver 62 can be programmed based on antenna length and precise position on the earth's surface (e.g., latitude and longitude) so that it produces the 1 pps reference signal pulse at timings precisely corresponding to the timings that other transmit site GPS receivers 62 produce their 1 pps reference signal—and in a fixed timing relationship to the same timing signals produced by a GPS receiver 64 at the control point. Hence, in this example, a transmit site's GPS receiver 62 provides a highly stable time base that is precisely synchronized with the GPS receiver time bases of all of the other transmit sites, and is also synchronized in a predetermined timing relationship with a GPS receiver 64 at the control site C. Since GPS receivers 62 are driven by satellites and not control point C, the timing signal provided by GPS receivers 62 are independent of control site communication links L or any associated path delays.

Although the different GPS receivers 62 are precisely synchronized with one another, in this example each GPS receiver at a transmit site S1 provides an additional fixed programmable delay in its output of the 1 pps reference signal. In this example, each transmit site GPS receiver 62 within system 50 is programmed to have the same additional programmable delay, whereas the GPS receiver 64 at the control point C does not introduce this added delay. The additional fixed delay establishes the range of delay adjustability that can be provided by the T1 delay 52. In this example, the delays programmed into the various GPS receivers 62 are nominally identical, and are empirically arrived at to provide an appropriate range of adjustability for the entire simulcast system 50. For example, each of transmit site GPS receivers 62 can provide their 1 pps reference outputs precisely in synchronization with one another but delayed by a one-second programmable time delay vis a vis the 1 pps reference output produced by the control site GPS receiver 64. See FIG. 3 in which the second bar (labeled "Site S1 Delay for 1 pps output of local GPS receiver 62(1)") and the fourth bar (labeled "Site SN Delay for 1 pps output of local GPS receiver (62(N)") represent this additional delay introduced by GPS receiver 62(1), 62(N), respectively.

In this example, the control site C provides timing signals (namely, a 9600 bps common clocking reference, a 1 pps reference, and a 300 Hz reference) within the T1 data stream communicated to each of transmit sites S. In particular, the control site C includes a sync module 66 used to derive a 300 Hz gating reference in phase with the control site "FSL" serial link. This 300 Hz reference signal along with the 1 pps reference signal from the control site's GPS receiver 64 and a 9600 bps clock reference also derived from GPS receiver timing (primarily for land-line backup) are combined into a composite reference data stream to be sent to each of the transmit sites S1, SN over links L.

The reference interface 60 at each site S1, SN extracts these various timing signals from link L and provides the 300 Hz gating reference signal to resync block 58 (as discussed below). In addition, it provides the 1 pps reference it obtains from the control site link L (along with the 9600 bps clocking reference) to a T1 delay control 68. The T1 delay control 68 similarly receives the 1 pps reference signal output (and the 9600 bps clocking reference) from the transmit site's GPS receiver 62. Delay control 68 compares the timing of the locally-generated 1 pps (and 9600 bps) reference signal with the 1 pps (and 9600 bps) reference signal obtained from the control site link, and determines the difference between them. That is, it produces a "Δ" timing value that is proportional to the timing difference between these two sets of reference signals. Since the more critical timing events being compared are the two 1 pps edges, the 9600 bps signal is not strictly necessary to this comparison but is used in the preferred example to increase accuracy. In particular, the 9600 bps signal received from the T1 link is passed through a phase locked loop circuit in the reference interface 60 to reduce its jitter. This reduced-jitter signal thus provides more accurate edge timing than is obtainable in this particular example based on the 1 pps reference signal alone.

Figure 3:
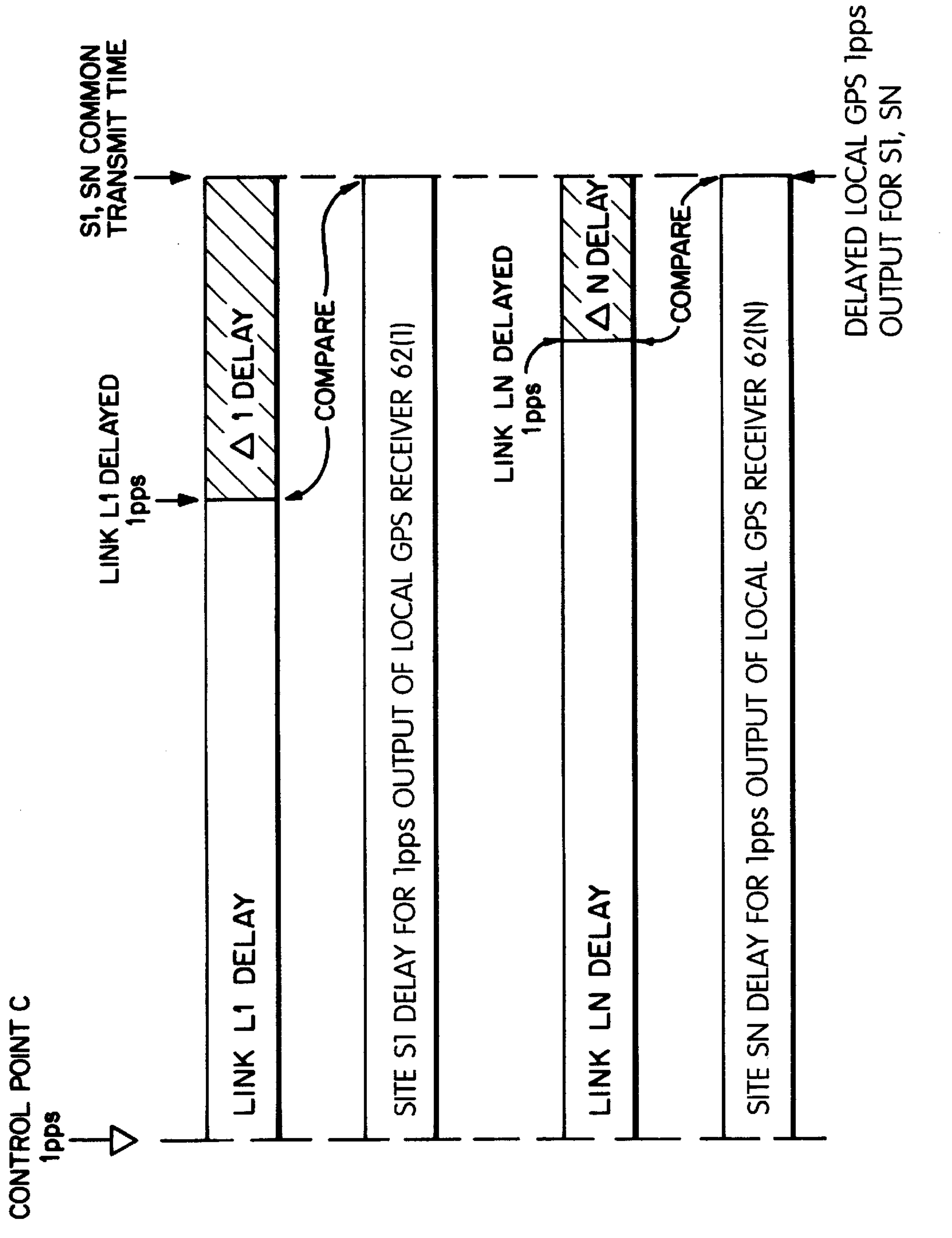
FIG. 3 illustrates some of the delays in the FIG. 2 system.

As shown in FIG. 3, the "Δ1 Delay" value produced by site S1's T1 delay control 68(1) represents the difference between the arrival time of the 1 pps signal supplied by the control point C over link L1. Similarly, the "ΔN Delay" value produced by site SN's T1 delay control 68(N) represents the difference between the arrival time of the 1 pps timing signal supplied by the control point C over link LN. Delay control blocks 68 use these "Δ" values to adjust the amount of delay introduced in the composite signal stream from link L by adjustable T1 delays 52—thereby equalizing the overall delay at each site.

In this example, the T1 delay control 68, the T1 delay 52, multiplexer 54, and reference interface 60 form a closed loop feedback control system that adaptably, continuously adjusts and maintains the "Δ" value to minimize or eliminate timing differences between the recovered 1 pps reference signal and the locally-generated 1 pps reference signal from GPS receiver 62 (with the specific timing event being looked at defined by the next succeeding edges of the recovered and locally-generated 9600 bps reference signals to increase accuracy by reducing jitter, as explained above). The result of this control process is to provide the appropriate compensated delay for the audio and high speed data and clock output of T1 multiplexer 54 (in addition to the reference composite output of the multiplexer—and thus all link supplied timing signals including the 1 pps signal as well as the 300 Hz gating reference applied to resync block 58) to compensate for the differences in or changes to the delay introduced by link L.

In this example, the delay control 68 never needs to (and never does) determine the absolute delay over the control site link L. Rather, the delay control 68 determines the delay of signals received over the link relative to the locally generated timing reference and adds to or subtracts from intentionally introduced additional delay to minimize the relative difference. Delay control 68 continuously (e.g., once each second) performs time delay correction in this example based on a periodic (1 pps) timing reference pulse train continuously supplied by the control point C over the link. This periodic pulse train does not represent absolute timing information. However, since it is supplied over the same link as the signals to be simulcasted, the arrival timing of this signal at the transmit site can be used for relative time delay comparison and equalization purposes. The time delay control 68 in this example operates all the time—even (and especially) during normal simulcast transmission times—to automatically, dynamically correct for changes in link delay. Unlike some prior systems, no "resynch" command needs to be issued by the control point C to cause the transmit site to adapt to changes in link time delay, nor does the trransmit site need to wait for any such "resynch" command. This is because in this example link control 68 operates essentially continuously, automatically and autonomously based on timing signals it is always receiving from the link.

Figure 1:
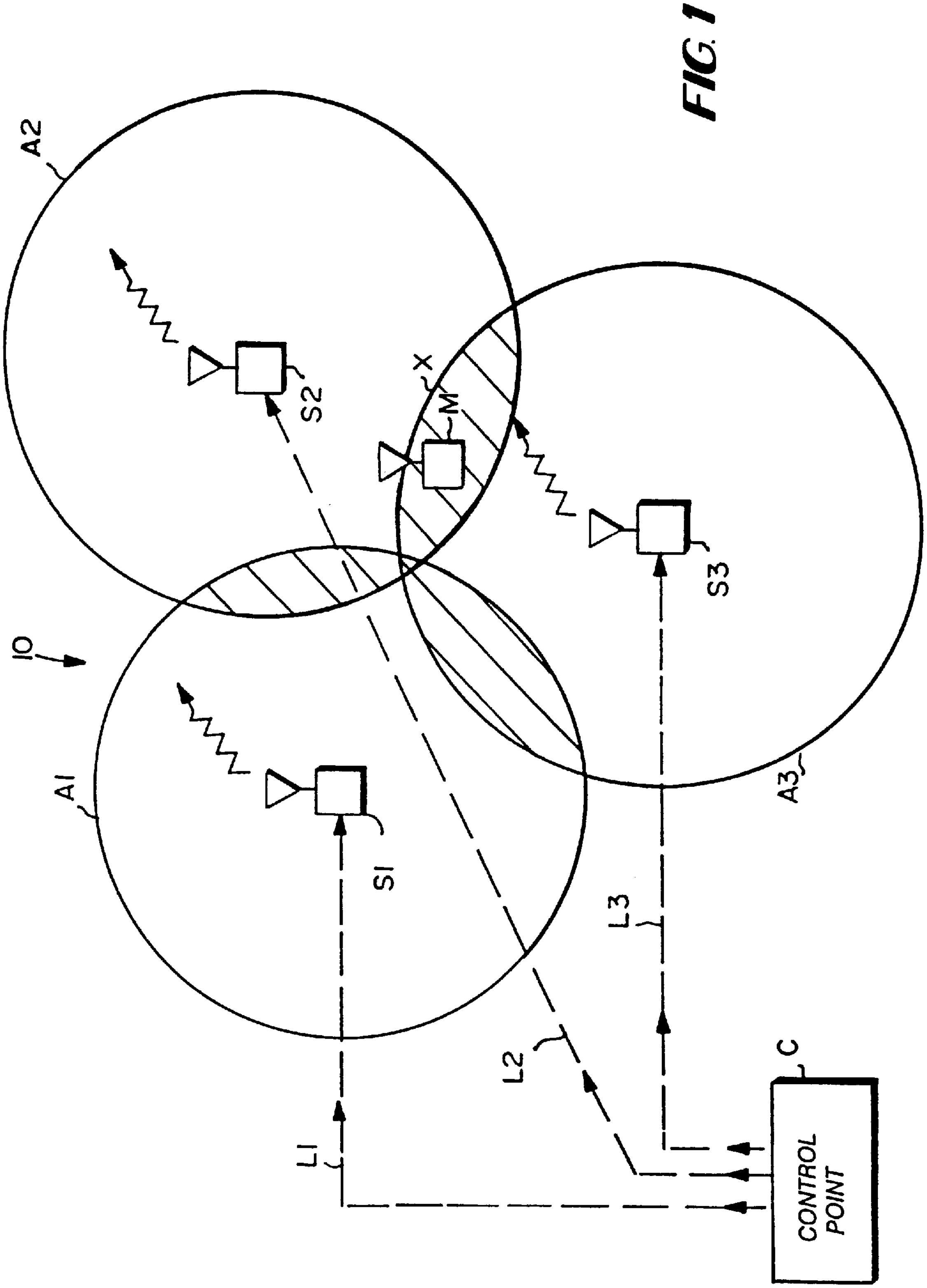
FIG. 1 shows a sample example of an overall simulcast system.

Although in the FIG. 3 example the programmable time delays programmed into each of transmit site GPS receivers 62 are identical, there may be some situations in which this programmable delay should differ between the transmit sites. The propagation delay associated with radio signals traveling at the speed of light to an overlap area X (see FIG. 1) may be different from one transmit site to another because of differences in the terrain. For example, one simulcast transmit site may be on a mountain top so that it is quite distant from but still within "line of sight" of an overlap region, but it may not be possible to locate an adjacent simulcast transmit site at such an optimal location—requiring the other site to be physically closer to the overlap region. Because the distances of the two sites to the overlap region differ, the time it takes each site to transmit onto the overlap region will also differ slightly. Engineers experienced in simulcasting understand that in order to maximize reliability, it is sometimes necessary to very slightly desynchronize the transmit timing of one such simulcast transmit site relative to an adjacent simulcast transmit site to compensate for such differences in RF propagation delays so that respective RF signal arrival times into the overlap regions are precisely synchronized. This additional degree of compensation may be provided in the example above by programming the transmit site GPS receivers 62 to provide slightly different delays—thereby desynchronizing the transmit site RF signal transmit times for the purpose of more precisely synchronizing the arrival times of these signals into overlap areas.

Detailed Example of a T1 Delay Control

Figure 4A:
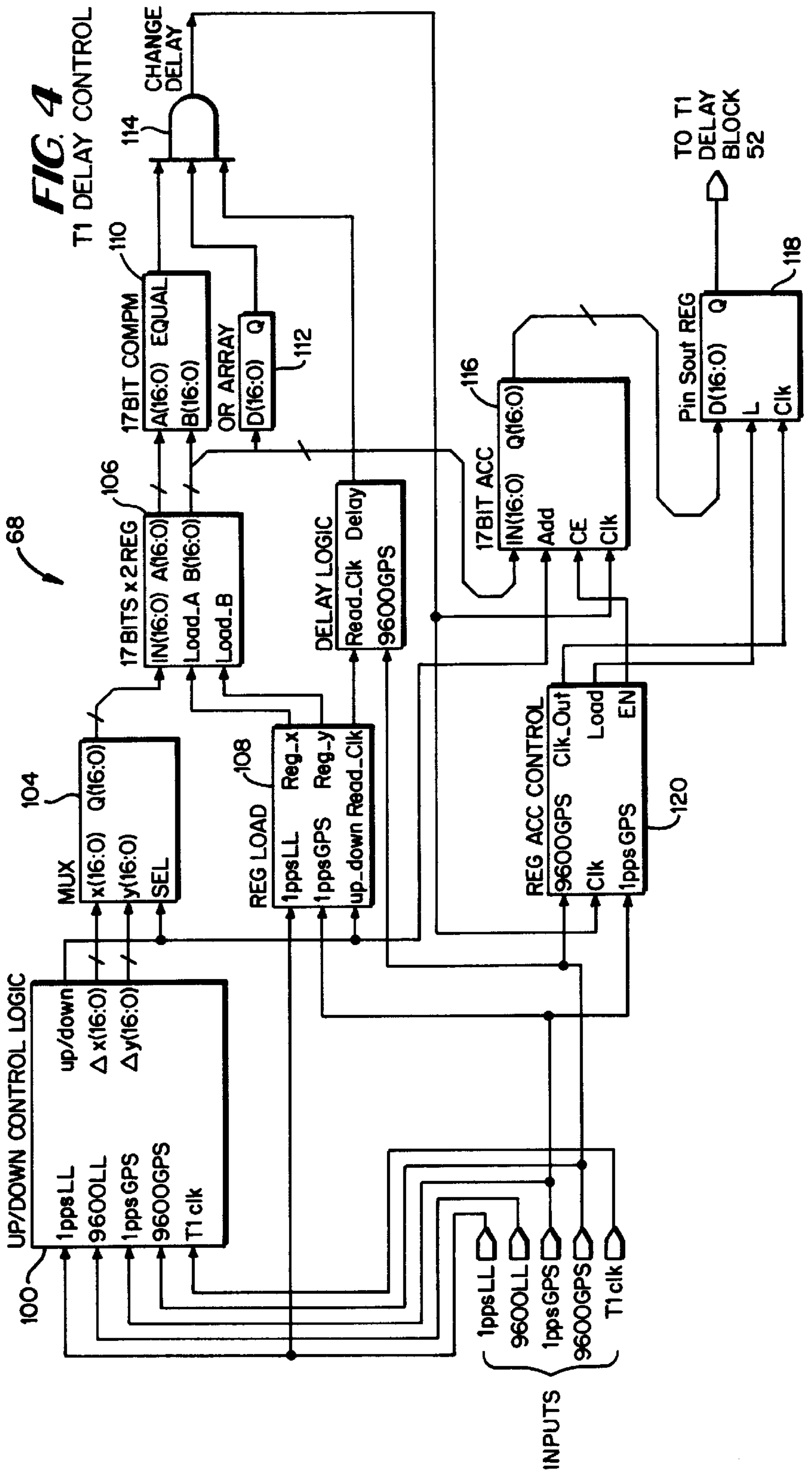
FIGS. 4*a* and 4*b* show example timing signals used/produced by the up/down control logic block of FIG. 4.
Figure 4A:
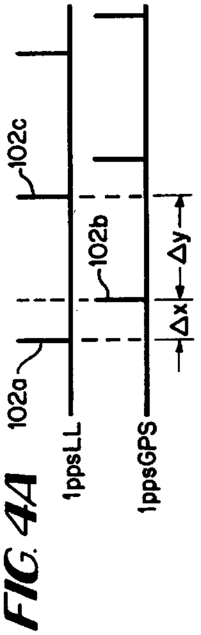

FIG. 4 shows a detailed example of a T1 delay control 68. T1 delay control 68 receives, as inputs, the 1 pps and 9600 bps signals from local GPS receiver 62 ("1 pps GPS" and "9600 GPS" inputs), and also receives the 1 pps and 9600 bps signals recovered by the reference interface block 60 from the information communicated over land line link L1 ("1 pps LL", "9600 LL"). In addition, the example T1 delay control 68 receives the 1544 KHz T1 clock recovered by MUX 54 ("T1clk"). These input signals are all applied to up/down control logic 100.

Up/down control logic 100 compares the timing of the pair of inputted 1 pps signals to determine whether they are aligned. If the timing is out of alignment, up/down control logic 100 decides which of the 1 pps signals inputted to it is "early or late," i.e., which signal leads and which signal lags. The up/down control logic determines the relative timing difference or displacement between the two signal pulse trains, and generates a time delay correction factor to be applied to the T1 delay 52.

Figure 4B:
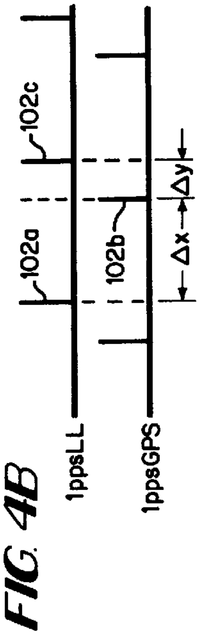

FIG. 4*a* is an example of two 1 pps pulse trains out of time synchronization with one another, with the signal from the control point C leading the signal from the local GPS receiver 62. As can be seen from the diagram, there is a time difference of Δx between the pulse 102*a* of the top (e.g., 1 pps LL) pulse train and a closest-in-time corresponding pulse 102*b* of the bottom (e.g., 1 pps GPS) pulse train. Similarly, there is a time difference Δy between the bottom pulse train pulse 102*b* and the next-closest pulse 102*c* of the top pulse train. When the two pulse trains are precisely synchronized, Δx=0 and Δy=the fixed delay introduced by GPS receiver 62, e.g., 1 second. If the top pulse train leads the bottom pulse train (as shown in FIG. 4*a*), Δx will be smaller than Δy and the most efficient way to synchronize the two pulse trains will be to control the T1 delay 52 to increase the amount of delay applied to the T1 signals coming over link L1 by a time delay Δx. On the other hand, if the pulse train derived from the L1 link lags the locally-provided 1 pps pulse train from GPS receiver 62 (as shown in FIG. 4*b*), Δx will be larger than Δy and the most efficient way to synchronize the two pulse trains will be to decrease the amount of delay the T1 delay 52 applies to the signals coming over link L1 by a time delay amount Δy.

Referring back to FIG. 4, the up/down control logic 100 continually determines both Δx and Δy. More specifically, the up/down control logic 100 may include two 17-bit counters, one to compute Δx and another to compute Δy. The Δx counter is triggered by the occurrence of, for example, a pulse in the top (land line) pulse train shown in FIGS. 4*a* and 4*b*, and stops counting when the next succeeding pulse in the bottom (local GPS) pulse train shown in FIGS. 4*a* and 4*b* arrives. In addition, arrival of the bottom (local GPS) pulse train pulse triggers the Δy counter to begin to count, and the Δy counter continues to count until the next succeeding pulse in the top (land line) pulse train arrives. This process is performed continually in a "see-saw" manner so that new Δx and Δy values are computed once per second. In this particular example, the counters within the up/down control logic can count at the rate of, for example, one-sixteenth of the T1 clock (1544 KHz) to achieve 17-bit resolution, but other counting rates/resolutions could be used as may be convenient.

The up/down control logic 100 compares the magnitude of its Δx count with the magnitude of its Δy count to determine whether the delay being applied by T1 delay 52 should be increased or decreased. It produces a single-bit "up/down" output indicating the results of the comparison. The up/down control logic 100 in this example also outputs both the Δx value counted by the Δx counter, and the Δy value counted by the Δy counter. All three of these outputs are applied to a multiplexer 104.

Multiplexer 104 selects either the Δx value or the Δy value based on the up/down bit. The selected output is loaded into one register in a register pair 106. Register pair 106 includes both an "A" and a "B" register. One of these registers (as selected by a register load block 108) stores the most current value selected by multiplexer 104. The other register within register pair 106 stores the Δx or Δy value previously selected by multiplexer 104.

Comparator 110 compares the last MUX 104 output with the next-to-last output of the MUX to determine whether they are equal. If they differ by at least a certain threshold (e.g., some non-zero small delay value to provide system hysteresis, as tested for by logic 112), then a "change delay" output produced by AND gate 114 is applied to an accumulator 116. Accumulator 116 in this example maintains the current delay value being applied by T1 delay 52. Accumulator 116 in this example applies the selected one of the Δx or Δy values as a correction factor to the delay currently being applied by T1 delay 52. In this example, accumulator 116 adds or subtracts the Δ value supplied by register pair 106 to its currently-accumulated value (it adds or subtracts based on the state of the up/down bit outputted by up/down control logic 100). This corrected value is clocked into output register 1 18 under control of logic 120 and sent to the T1 delay 52 as the new delay control value.

Detailed Example of T1 Delay

In this example, the T1 delay 52 should be capable of providing an adjustable delay of between 0 and 80 ms with a unit interval step size. T1 delay block 52 could be any conventional arrangement capable of providing an adjustable delay to the T1 digital stream. In Ericsson Inc. simulcast systems in public use and on sale more than a year prior to this filing, digitally-adjustable delays for T1 communications links were provided using a conventional FIFO (first-in-first-out) SRAM buffering arrangement where the "depth" of the buffer (i.e., the displacement between the write address and the read address) determined the amount of delay. In these prior art arrangements, the "depth" of the buffer was typically set by manually operating a DIP switch, and was thus fixed at system installation time to correspond to the particular delay needed for a specific link. Such a prior arrangement needs to be modified to provide an adjustable delay.

Figure 5:
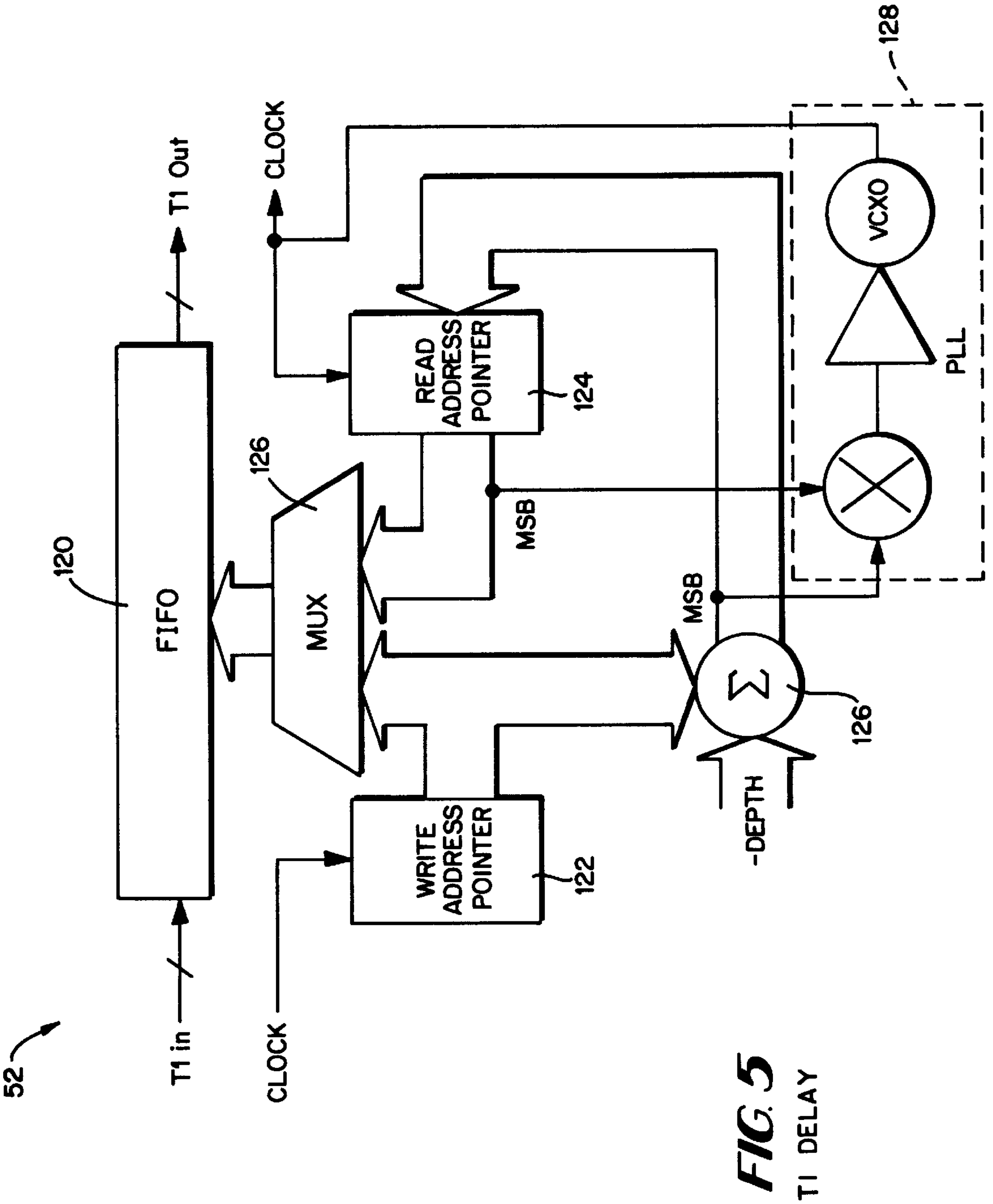
FIG. 5 is a functional diagram of a detailed example of a possible T1 delay block.

FIG. 5 shows an example of a T1 delay 52 design developed by Ericsson's outside contractor, Intraplex, Inc., of Westford, Mass., based on specifications provided by Ericsson. The specific implementation shown in FIG. 5 includes a conventional FIFO 120 implemented by a static RAM, for example. A write address counter/pointer 122 clocked at the T1 clock rate specifies the write address for writing into the FIFO 120, and a read address counter/pointer 124 specifies the read address for reading out of the FIFO. A multiplexer 126 selects between the write address and the read address based on whether the system is currently writing data into the FIFO 120 or reading data out of it. A "depth" value is added to the write address pointer 122 by an adder 126 to specify the displacement in the FIFO 120 between data written into it and data being read from it—thus specifying the "depth" or "length" of the FIFO and hence the amount of delay the FIFO applies. In the specific example shown, the depth value is provided (e.g., serially) by the digital output value of T1 delay control register 118 shown in FIG. 4. Thus, this depth value indicates the total amount of delay T1 delay 52 should apply. In another implementation, the accumulating function performed by T I delay control 116 could instead be performed by T1 delay 52 such that T1 delay control 68 would only apply its "Δ" correction value to T1 delay 52.

Unlike Ericsson's prior digital delay arrangements, the read address pointer 124 in this example arrangement developed by Intraplex is incremented by a phase-locked-loop-based clocking arrangement 128. This PLL clocking arrangement 128 is intended to allow delay changes to occur smoothly and gradually rather than abruptly. During delay changes, the FIFO read frequency will change gradually based on the limited bandwidth of the PLL loop filter characteristics. In this specific arrangement developed by Intraplex, the delay adjustment requires one second for every 100 ms of delay change and 10 seconds for 1 ms of delay change. To ensure that the fundamental frequency components at the PLL phase detector inputs do not cause excessive read clock jitter, the MSB (or multiple bits) of the read address counter 124 output are summed with the MSB (or multiple bits) of the output of summer 126 to control the PLL frequency.

Digital Control Signal Resynch

Referring again to FIG. 2, sync module 66 at the control site derives the 300 Hz gating reference in phase with the "FSL" of the EDACS system. This 300 Hz gating reference, along with a 1 pps signal from the control point's GPS receiver discussed above, are combined into a reference data stream to be sent to the transmit sites. A clock reference of 9600 bps, 4800 bps, or 2400 bps, for land-line backup, may also be provided in combination. At each of the transmit sites, the high speed data may go through a resynchronization module 58 to "fine tune" the adjustment of the high speed data edge timing based on the 300 Hz reference obtained from the control point communications link (as time-compensated as discussed above), and may also receive a 9600 bps clock reference (produced, e.g., by the local GPS receiver in this example). Thus, in this specific example, the 300 Hz reference signal is extracted from the composite reference signal provided over the control point communications link and is used along with the GPS-generated 9600 bps clock signal as inputs to the resync module. Alternatively, the 300 Hz reference signal inputted to the resynch module could be generated by the local GPS receiver if desired.

A new simulcast dynamic delay adjustment capability has been described which continually, dynamically adjusts the amount of delay applied to a T1 data stream to ensure common synchronization at multiple simulcast transmitter sites with a GPS-based distributed time standard. This arrangement eliminates the need for resynchronization of the control point, allows for automatic, dynamic correction/compensation of path delay changes over a range that is independent of the frequency of the RF signaling, and can correct delays over a wide range not known ahead of time—all without loss of service.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a simulcasting transmission system that wirelessly continually simulcasts a radio signal from plural transmission sites, a method of achieving substantially synchronous signal transmission timing of said simulcasted radio signal by said plural transmission sites, said method comprising the following steps performed by at least one of said plural transmission sites:

(a) receiving, over a link having an inherent propagation time delay, at least one of a voice signal and a data signal for simulcast transmission;

(b) delaying said received voice or data signal by an additional, adjustable delay;

(c) receiving at least one timing pulse train over said same link used to communicate said voice or data signal, said timing pulse train having a pulse timing characteristic;

(d) generating a reference timing pulse train having a pulse timing characteristic;

(e) comparing the pulse timing characteristic of said generated reference timing pulse train with the pulse timing characteristic of said timing pulse train received over said link;

(f) automatically adjusting the delay provided by said delaying step (b) based on results of said comparison; and (g) while performing said steps (e) and (f), continuing to perform said receiving step (a) and said delaying step (b), and continuing to simulcast said delayed received signal.

2. A method as in claim 1 including repeating said steps (e) and (f) on the order of at least once every second.

3. A method as in claim 1 wherein said delaying step (b) also delays said received timing pulse train, said comparing step (e) compares the pulse timing characteristic of said delayed received timing pulse train with the pulse timing characteristic of said reference timing pulse train.

4. A method as in claim 1 wherein said adjusting step (f) includes:

(i) starting a first counter and stopping a second counter upon receipt of a pulse in said received timing pulse train;

(ii) starting said second counter and stopping said first counter upon receipt of a pulse in said reference timing pulse train;

(iii) comparing said first counter contents to said second counter contents; and (iv) determining whether to increase or decrease the amount of said delay based on the results of said step (iii).

5. A method as in claim 1 wherein said generating step (d) includes the step of delaying the output of a Global Satellite Positioning receiver by a predetermined amount.

6. A method as in claim 1 wherein said delaying step (b) comprises passing said received signal through a digital first-in-first-out buffer.

7. A method as in claim 1 wherein said comparing step (e) includes the step of ignoring timing differences less than a predetermined threshold amount.

8. A method as in claim 1 wherein said comparing step (e) includes the step of requiring that plural successive detected differences in said pulse timing characteristics be substantially the same.

9. A method as in claim 1 wherein:

said receiving step (c) includes receiving plural timing pulse trains over said link;

said generating step (d) includes generating plural timing pulse trains each having a pulse timing characteristic; and said comparing step (e) comprises comparing the pulse timing characteristics of each of said plural timing pulse trains received over said link with pulse timing characteristics of corresponding ones of said plural timing pulse trains generated by said generating step (d).

10. A method as in claim 9 wherein said generated plural timing pulse trains have different frequencies.

11. A method as in claim 1 wherein said receiving step (c) includes using a phase locked loop to reduce jitter in said received timing pulse train.

12. A method as in claim 1 wherein said transmitting step (g) includes the step of resynchronizing said delayed signal before simulcasting said delayed signal.

13. A method as in claim 12 wherein said resynchronizing step comprises generating a resynchronizing timing signal at said transmission site and using said resynchronizing timing signal to resynchronize said delayed signal.

14. A method as in claim 12 wherein said resynchronizing step comprises using a resynchronizing timing signal received over said link by said receiving step (a) and delayed by said delaying step (b).

15. A method as in claim 1 wherein said step (a) is continually performed without requiring said simulcasted video signal to be interrupted for synchronization purposes.

16. In a simulcasting transmission system having plural transmission sites continually simulcasting a signal at a transmission timing, a method of synchronizing the transmission timing of said plural transmission sites comprising:

(a) continually receiving, over a link having an inherent propagation time delay, at least one of a voice signal and a data signal for simulcast transmission and also continually receiving, over said same link used to communicate said voice or data signal, a first periodic reference timing pulse train signal having a pulse timing characteristic;

(b) delaying said received voice or data signal and said received first periodic reference timing pulse train signal by an additional, adjustable delay;

(c) generating a second periodic reference timing pulse train signal having a pulse timing characteristic;

(d) comparing the pulse timing characteristic of said first periodic reference timing pulse train signal with the pulse timing characteristic of said second periodic reference timing pulse train signal; and (e) automatically adjusting said delay provided by said delaying step (b) based on results of said comparison.

17. A method as in claim 16 wherein said step (c) is performed without requiring substantial interruption of said received voice or data signal for synchronization purposes.

18. In a simulcasting transmission system that substantially continually simulcasts signals from plural transmission sites, a method of ensuring synchronous transmission timing comprising:

(a) receiving plural signals including a reference timing pulse train signal over a link from a control point, said link also carrying voice or data signals to be simulcasted by said simulcasting transmission system;

(b) delaying all of said received plural signals by a same adjustable time delay and simulcasting at least some of said received delayed signals;

(c) comparing an arrival time of said delayed reference timing pulse train signal with a locally generated reference timing signal; and (d) automatically adjusting said adjustable time delay based on the results of said comparison to correct the timing of said simulcasted signal(s).

19. A method as in claim 18 wherein:

(i) said step (c) includes locally generating said reference timing pulse train signal so that it has a predetermined delay relative to said reference timing pulse train signal received from said link; and said adjusting step (d) comprises further delaying said link reference timing signal to match the timing of said locally generated reference timing pulse train signal.

20. A method as in claim 18 wherein said step (d) is performed without requiring interruption of said simulcasted signal(s) for synchronization purposes.

21. In a simulcasting transmission system that substantially continually simulcasts a voice or data signal substantially concurrently from plural transmission sites, a method of achieving substantially synchronous signal transmission timing by said plural transmission sites, a method comprising the following steps:

sending, from a control point over communications links, the voice or data signal for transmission to each of the plural sites and also sending, over the communications links, a timing pulse train signal to each site;

receiving said voice or data signal and said timing pulse train signal at at least one of the transmission sites, said received timing pulse train signal having a certain arrival timing;

generating a reference timing based on a Global Positioning System reference;

comparing the generated reference timing with the arrival timing of said received timing pulse train signal;

automatically delaying the received voice or data signal by an adjustable delay, and adjusting the delay based at least in part on results of said comparison; and simulcasting said delayed voice or data signal.

22. A method as in claim 21 wherein said delaying step also delays said received timing pulse train signal, and said comparing step compares said delayed received timing pulse train signal to said reference timing.

23. A method as in claim 21 wherein said comparing step includes:

(1) starting a first counter and stopping a second counter upon receipt of a pulse in said received timing signal;

(2) starting said second counter and stopping said first counter in response to said reference timing;

(3) comparing said first counter contents to said second counter contents; and (4) determining whether to increase or decrease the amount of said delay based on the results of said step (3).

24. A method as in claim 21 wherein said Global Satellite Positioning receiver has at least one timing output, said generating step includes the step of delaying the Global Satellite Positioning receiver timing output by a predetermined amount.

25. A method as in claim 21 wherein said delaying step comprises passing said received signal through a digital first-in-first-out buffer.

26. A method as in claim 21 wherein said comparing step includes the step of ignoring timing differences less than a predetermined threshold amount.

27. A method as in claim 21 wherein said comparing step includes the step of requiring that plural successive detected timing differences be substantially the same.

28. A method as in claim 21 further characterized by the step of using a phase locked loop to reduce jitter in said received timing pulse train.

29. A method as in claim 21 wherein said simulcasting step includes the step of resynchronizing said delayed signal before simulcasting the delayed signal.

30. A method as in claim 29 wherein said resynchronizing step comprises generating a resynchronizing timing signal at said transmission site and using said resynchronizing timing signal to resynchronize said delayed signal.

31. A method as in claim 29 wherein said resynchronizing step comprises using a resynchronizing timing signal received over said link and delayed by said delaying step.

32. A method as in claim 21 further characterized in that the delaying step is further characterized by the step of matching the timing of the delayed timing signal with the reference timing.

33. A method as in claim 21 further characterized in that the delaying step includes passing the signal through a first-in-first-out digital buffer delay element.

34. A method as in claim 21 further characterized in that the comparing step includes the step of using hysteresis to ignore timing differences below a certain threshold.

35. A method as in claim 21 wherein said simulcasting step is performed without requiring interruption of said voice or data signal for synchronization purposes.

36. A simulcasting transmission system of the type including a simulcasting control point coupled by corresponding plural links to plural simulcasting transmission points, the plural simulcasting transmission points simulcasting a voice or data signal so that the simulcasted voice or data signal can be received from any of said plural simulcasting transmission points at substantially the same time over substantially the same radio transmitting frequency, said system characterized by the following equipment installed at each of the transmission points:

a receiver coupled to at least one of said links that receives plural signals including a reference timing pulse train signal from the control point over said at least one link;

a delay circuit that delays all of said received plural signals, including said reference timing pulse train signal, by a same adjustable time delay;

a comparing circuit that compares an arrival time of said delayed reference timing pulse train signal with a locally generated reference timing signal derived from at least one Global Positioning System reference;

a delay adjusting circuit that automatically adjusts said adjustable time delay bused on the results of said comparison; and a transmitter coupled to said delay circuit, said transmitter continually transmitting at least some of said received, delayed plural signals.

37. A system as in claim 36 further characterized in that:

said comparing circuit includes a circuit that locally delays said reference timing signal so that it has a predetermined delay relative to said reference timing pulse train signal received from said link; and said delay adjusting circuit further delays said link reference timing pulse train signal to match the timing of said locally generated reference timing signal.

38. A system as in claim 36 wherein said transmitter substantially continually transmits said at least some of said received, delayed plural signals without requiring interruption in said at least some of said received, delayed plural signals for synchronization purposes.

* * * * *